(12) United States Patent
Huber et al.

(10) Patent No.: US 6,243,636 B1
(45) Date of Patent: Jun. 5, 2001

(54) TWO STAGE TORQUE CONTROL METHOD FOR A VEHICLE TRANSMISSION

(75) Inventors: Jon M. Huber; James De Vore; Sean Carey, all of Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 66 days.

(21) Appl. No.: 08/910,822

(22) Filed: Aug. 13, 1997

(51) Int. Cl.$^7$ ........................................ G06F 7/00
(52) U.S. Cl. .................. 701/51; 701/55; 701/69; 701/66; 477/109; 477/110
(58) Field of Search ............... 701/51, 36, 69, 701/54, 61, 66; 477/106, 109, 110, 156, 102, 97, 107, 154, 120, 143, 158, 155; 475/210, 214; 74/664, 336 B, 665 GE, 720, 721, 337; 192/3.31

(56) References Cited

U.S. PATENT DOCUMENTS

| | | | |
|---|---|---|---|
| 4,263,826 | * 4/1981 | Hartz et al. | 477/30 |
| 4,474,083 | 10/1984 | Braun | 477/107 |
| 4,493,228 | 1/1985 | Vukovich et al. | 477/109 |
| 4,593,580 | 6/1986 | Schulze | 477/109 |
| 4,662,492 | * 5/1987 | Troeder | 477/177 |
| 4,850,236 | 7/1989 | Braun | 74/337 |
| 4,868,753 | * 9/1989 | Mori | 701/66 |
| 4,953,090 | * 8/1990 | Narita | 701/66 |
| 5,131,295 | * 7/1992 | Kodama | 477/155 |
| 5,184,527 | * 2/1993 | Nakamura | 477/110 |
| 5,261,298 | 11/1993 | Markyvech | 477/110 |
| 5,303,614 | * 4/1994 | Sakaki et al. | 477/158 |
| 5,505,675 | * 4/1996 | Kuriyama et al. | 477/156 |
| 5,573,477 | 11/1996 | Desautels et al. | 477/109 |
| 5,631,829 | * 5/1997 | Takasaki et al. | 701/70 |
| 5,724,866 | * 3/1998 | Minowa et al. | 74/664 |

* cited by examiner

Primary Examiner—Jacques H. Louis-Jacques
(74) Attorney, Agent, or Firm—Carlson, Gaskey & Olds

(57) ABSTRACT

A semi-automated vehicle transmission includes a method of returning torque control to the driver of the vehicle. The transition from an initial current torque value to a desired torque value is accomplished in two stages. A first rate of change is utilized during a preselected time period or until the current torque value corresponds to the desired torque value. In the event that the desired torque value is not achieved during the preselected period of time, then a second rate of change is implemented. The second rate of change preferably is very aggressive relative to the first rate of change. The rate of change of the current torque value is accomplished within a window of available torque limits that progressively change with time.

19 Claims, 3 Drawing Sheets

TWO STAGE TORQUE CONTROL METHOD FOR A VEHICLE TRANSMISSION

BACKGROUND OF THE INVENTION

This invention generally relates to a method of controlling a change in a torque value of a semi-automated vehicle transmission system using a two-stage process.

Vehicle transmissions are well known and include automatic, manual and semi-automatic types. Each of the transmission types have advantages that make them suitable for various applications. Heavy duty vehicles typically include a manual or, more recently, a semi-automatic transmission. Semi-automatic transmissions of various types have been proposed. The basic principal is to assist a driver in performing a manually selected gear ratio change using a system that is at least partially automated. While such transmissions have advantages, they are not without shortcomings and drawbacks.

For example, in a partially automated transmission at some point during a gear ratio change, the driver is precluded from controlling the engine and transmission. The transition from automated control back to driver control is often accompanied by less than desirable phenomena. For example, a change in torque value when returning control to the driver can result in wheel slip or a relatively abrupt change in vehicle wheel speed. Both of these conditions are potentially annoying or distracting to a driver of the vehicle and introduce potential undue wear on the transmission.

Therefore, it is desirable to provide a method of controlling torque changes in a vehicle transmission that results in a more smooth transition between operating states when returning control of the transmission and engine to the driver of the vehicle. This invention addresses those needs and provides an effective solution.

SUMMARY OF THE INVENTION

In general terms, this invention is a method of controlling a torque value in a vehicle transmission. The method of this invention is particularly useful for controlling torque values when returning control of a transmission and vehicle engine to the driver.

The inventive method includes several basic steps. Once a desired torque value is determined, a matching condition is defined where the current torque value corresponds to the desired torque value. The current torque value is then changed at a first rate of change so that it approaches the desired value. The current torque value is progressively changed at the first rate until the matching condition exists or a preselected period of time elapses. If the matching condition does not exist after the preselected period of time elapses, then the current torque value is changed at a second rate of change until the matching condition exists and the current torque value corresponds to the desired torque value. In the preferred embodiment, the second rate of change is greater than the first.

The preferred rate of change is determined within an available window of torque values. The available window begins at an initial current torque value and progressively expands so that a maximum and minimum limit of the available window progressively increase and decrease, respectively. The maximum limit increases until it corresponds to the desired torque value. The minimum limit decreases until it corresponds to a predetermined absolute minimum torque value. The predetermined absolute minimum torque value is that torque which is minimally necessary to prevent the engine of the vehicle from stalling.

The various features and advantages of this invention will become apparent to those skilled in the art from the following detailed description of the preferred embodiment. The drawings that accompany the detailed description can be described as follows.

DETAILED DESCRIPTION OF THE PREFERRED EMBODIMENT

Figure 1:
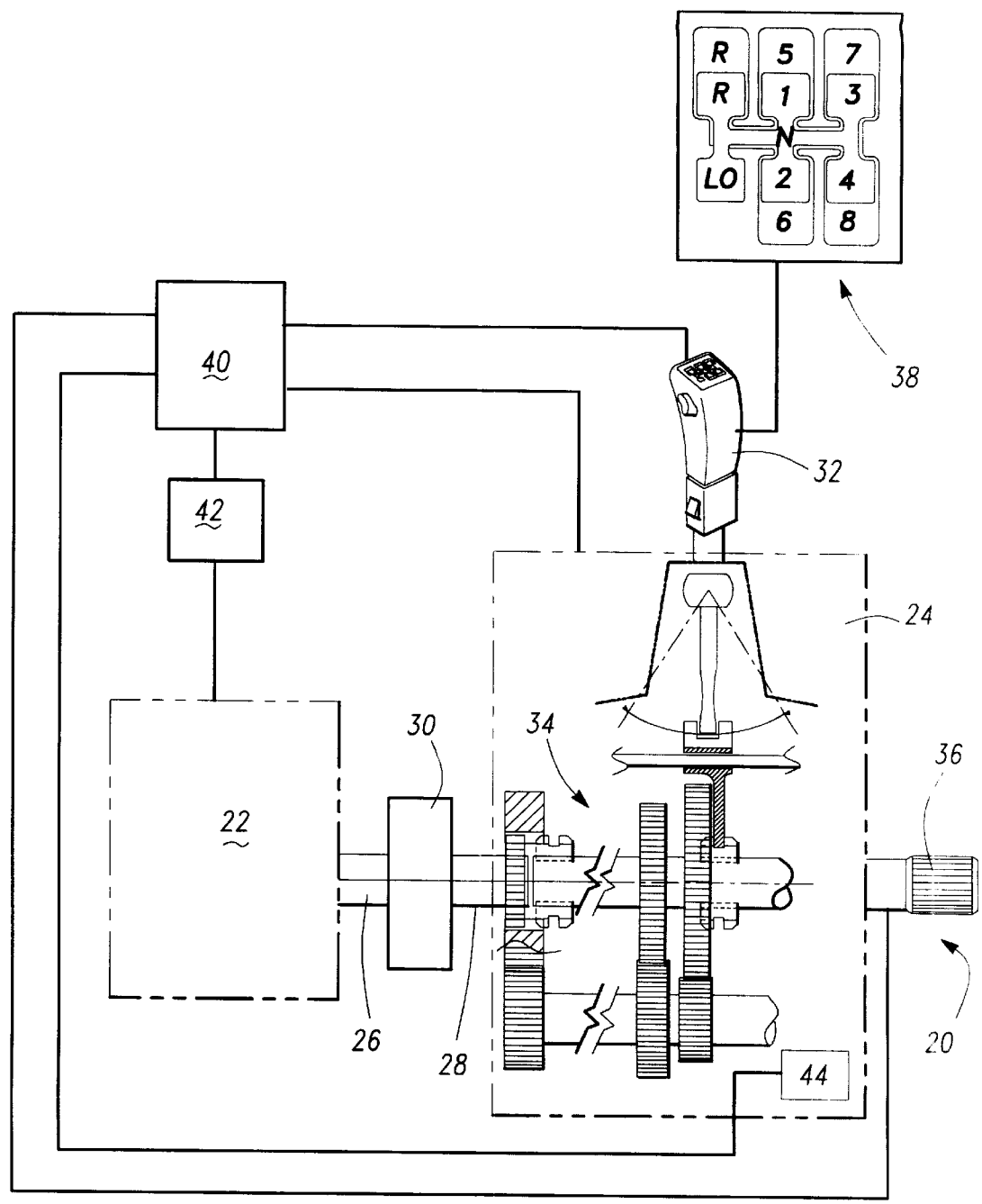
FIG. 1 is a schematic illustration of a vehicle transmission system.

FIG. 1 schematically and diagrammatically illustrates a vehicle transmission system 20. An engine 22 provides a motive force to propel a vehicle by driving a transmission 24. The engine 22 includes an output shaft 26 that causes rotation of a transmission input shaft 28 through a master clutch 30. A manual shift lever 32 allows a driver to manipulate gears within a gearing arrangement 34 to alter a gear ratio between the transmission input shaft 28 and a transmission output shaft 36. The transmission output shaft 36 drives the wheels of the vehicle in a conventional manner. The shift lever 32 can be moved in a pattern as illustrated at 38 to achieve various gear ratios within the transmission 24.

An electronic controller 40 provides semi-automatic control of the transmission system 20. The controller 40 is schematically illustrated as a single microprocessor, for example. The controller 40 can be realized, as will be appreciated by those skilled in the art, by one or more microcomputers, custom designed microcontrollers, software, dedicated circuitry or a combination of one or more of these. The controller 40 controls the engine 22 primarily by controlling the amount of fuel supplied to the engine 22 through a fuel control schematically illustrated at 42. By controlling the amount of fuel supplied to the engine 22, the rotational speed of the engine output shaft 26 is controlled. A plurality of sensors schematically illustrated at 44 provide information to the control 40 regarding gear placement and ratios within the transmission 24.

The manner of controlling the transmission system 20 preferably is accomplished similar to that disclosed in U.S. Pat. No. 5,582,558. The teachings of that patent are incorporated into this specification by reference.

When a driver of a vehicle having the transmission system 20 decides to implement a semi-automated gear ratio change, at some point the controller 40 will preclude the driver from controlling the engine 22 so that an effective gear change can be made. At the end of a completed gear change, engine speed and torque are returned to the control of the driver. At that point, the torque value of the transmission must be at a torque value corresponding to the desired gear just engaged during the change. In many instances, the desired torque value is relatively significantly different (and typically higher) than a current torque value utilized during the ratio change. Accordingly, the controller 40 must establish a torque value corresponding to the desired torque value, which corresponds to the chosen gear ratio. The limitations of the mechanical components of the transmission system 20 do not make it possible to instantaneously change from a current torque value to a desired torque value. Further, if that change is not effected in a particular manner, the result can be undesirable wheel slip and a poor response to the driver as torque is returned to the driver's control.

This invention includes a two-stage transition from a torque value utilized during a gear ratio change and a desired torque value requested by the driver for driving the vehicle in a desired gear ratio.

Figure 2:
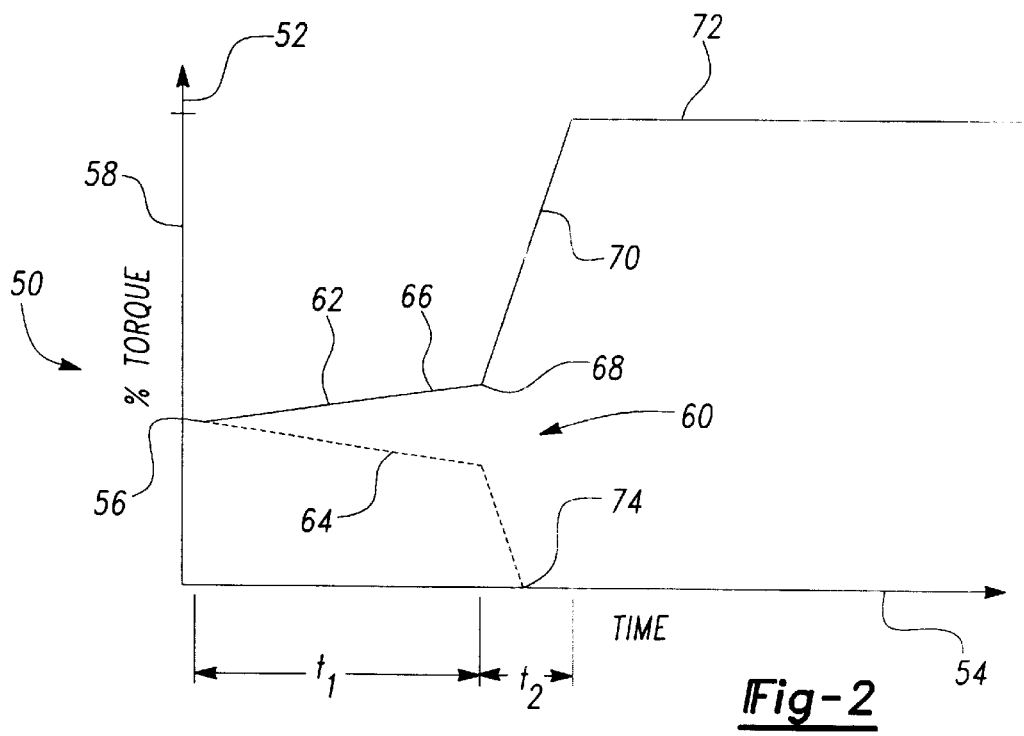
FIG. 2 is a graphic illustration of an implementation of a method of this invention.

FIG. 2 includes a graphic illustration 50 of an implementation of a method of this invention. FIG. 2 shows a plot of percentage torque along an axis 52 versus time along an axis 54. During a semi-automated gear ratio change, a torque value 56 was used. At the point of returning control of the system to the driver, the torque value at 56 can be considered an initial current torque value. The desired torque value shown at 58 is requested by the driver by positioning the throttle pedal, for example. The challenge is to transition from the current torque value 56 to the desired torque value 58 while avoiding undesirable phenomena such as wheel slip.

The method of this invention includes utilizing an available torque value window 60. An upper limit of the available window 60 is illustrated at 62 while a lower limit is illustrated at 64. As can be appreciated from the drawing, the maximum and minimum limits of the available window 60 progressively increase and decrease, respectively, with time. The solid line of FIG. 2 corresponds to the current torque value of the system. In this example, the current torque value tracks or matches the upper limit of the available torque window 60. Those skilled in the art will appreciate that the current torque value need not track the outer limit of the available torque window under all circumstances.

The maximum torque limit increases at a first rate along the portion 66 until a torque value is reached at 68. The torque value at 68 is reached after a period of time $t_1$, which is a preselected period of time. In one example, the preselected period of time $t_1$ is set at 350 milliseconds. After the time period $t_1$ elapses, a determination is made whether the current torque value corresponds to the desired torque value. As can be appreciated from the drawing, the value at 68 is significantly lower than the desired torque value at 58. Accordingly, the maximum torque limit and the current torque value are then increased at a second rate of change along the portion of the curve shown at 70. In the preferred embodiment, the second rate of change is substantially greater than the first rate of change. The current torque value is increased at the second rate of change until the current torque value corresponds to the desired torque value at 72. As can be appreciated from the drawing, the time period $t_2$ is less than the time period $t_1$.

The lower limit of the available torque window 60 decreases at the first rate along the portion of the dotted curve shown at 64. Once the time period $t_1$ has elapsed, the second rate of change is implemented. The minimum limit decreases until a point illustrated at 74 where the minimum torque value reaches an absolute minimum value. The absolute minimum value corresponds to that minimum value of torque necessary to prevent the engine from stalling.

Utilizing a two-stage transition from an initial current torque value to a desired torque value provides a more smooth or desirable response to the driver. Further, this reduces shock on the driveline and enhances the performance of the vehicle experienced by the driver. The methodology of this invention includes using a two-stage transition. Although the illustration of FIG. 2 includes two generally linear stages, other transition rates, such as non-linear, exponential or other rate changes could be implemented. A generally linear first rate and a generally linear second rate are utilized for purposes of illustration.

Figure 3:
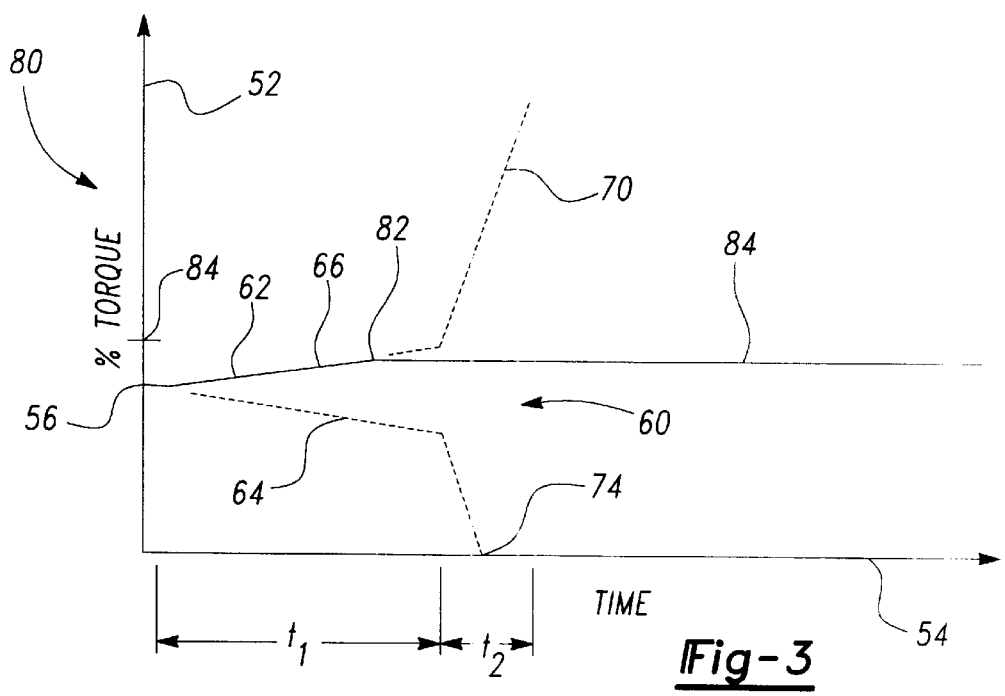
FIG. 3 is a graphic illustration of the method of this invention under different conditions.

FIG. 3 illustrates another implementation of the method of this invention. The plot 80 includes the same initial current torque value 56. The desired torque value in this instance is significantly lower than that illustrated in FIG. 2. The current torque value is progressively increased at the same first rate discussed above until a point illustrated at 82 where the current torque value corresponds to the desired torque value 84. The dotted lines in FIG. 3 illustrate the available torque window 60 corresponding to that shown in FIG. 2. In the example of FIG. 3, however, the current torque value reaches the point of matching the desired torque value much sooner than that accomplished in the example of FIG. 2. Specifically, the point 82 is reached before the preselected period of time $t_1$ elapses. In this instance, therefore, there is no need to transition to a second rate of change because the desired torque value is already achieved.

Utilizing a window having a maximum and minimum available torque limit is most preferred. A significant advantage is provided by utilizing limits rather than specifying a specific current torque value because an anti-lock brake system, cruise control or traction control system are allowed to override the torque transition if the controller 40 determines that is necessary. The manner in which an anti-lock brake system, traction control or cruise control system would override the transition from a current torque value to a desired torque value is not the subject of this invention and, therefore, need not be further described.

Figure 4:
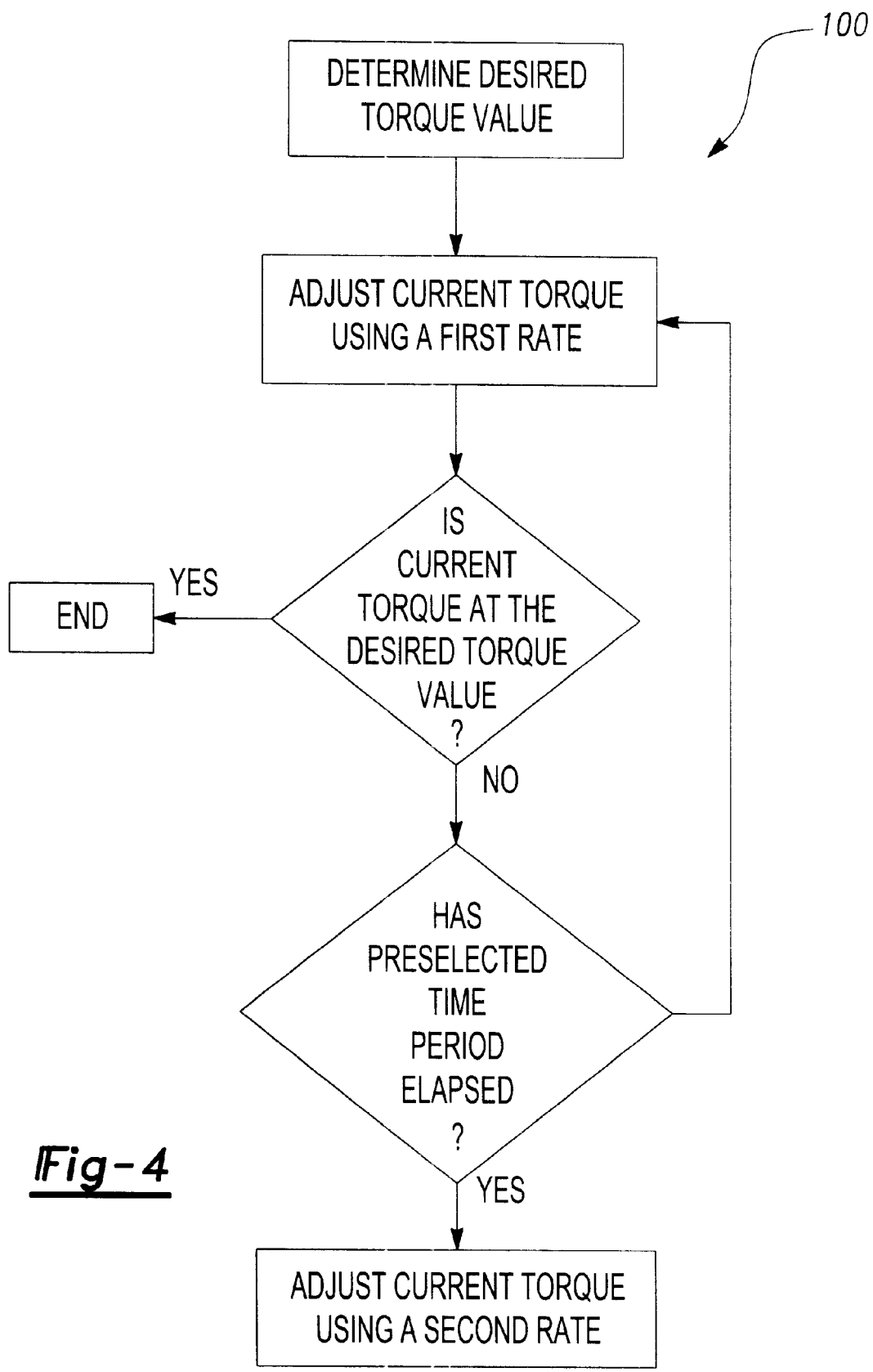
FIG. 4 is a flow chart diagram summarizing the method of this invention.

As illustrated at 100 in FIG. 4 is a flow chart diagram and explained above, the method of this invention preferably includes two rates of change. The first rate of change is used during a first preselected period of time. If the desired torque value is not achieved within that period of time, then a second rate of change is implemented. The second rate of change is preferably very aggressive relative to the first rate of change. The same rate of change is utilized for an upper and a lower limit of the available torque window at any given moment during the torque transition period.

The foregoing description is exemplary rather than limiting in nature. Variations and modifications to the disclosed embodiment may become apparent to those skilled in the art that do not necessarily depart from the purview and spirit of this invention. Accordingly, the legal scope of protection given to this invention can only be determined by studying the following claims.

We claim:

1. A method of controlling a current torque value in a vehicle transmission, comprising the steps of:
   (A) determining a desired torque value for use during a portion of a shifting operation;
   (B) defining a condition when the current torque value corresponds to the desired torque value;
   (C) changing the current torque value at a first rate of change so that the current torque value approaches the desired value from step (A) until the condition from step (B) exists or a preselected period of time lapses;
   (D) determining whether the condition from step (B) exists when the preselected period of time elapses; and
   (E) when the condition from step (B) does not exist when the preselected period of time elapses, changing the current torque value at a second rate of change that is greater than the first rate of change until the condition from step (B) exists.

2. The method of claim 1, wherein step (A) is performed by approximating the desired torque value by determining a driver requested torque value that corresponds to a driver requested gear ratio.

3. The method of claim 1, wherein step (C) is performed by setting a torque limit, changing the current torque value to be within the set limit, and changing the limit at the first rate as a function of time such that the current torque value changes at the first rate.

4. The method of claim 3, wherein step (C) is performed by progressively increasing the limit.

5. The method of claim 3, wherein the torque limit has a maximum and a minimum value and wherein step (C) is performed by progressively changing the maximum value until the maximum value corresponds to the desired torque value and progressively changing the minimum value until the minimum value corresponds to a predetermined absolute minimum value.

6. The method of claim 5, wherein step (E) is performed by setting a torque limit, changing the current torque value to be within the set limit, and changing the limit at the second rate as a function of time such that the current torque value changes at the second rate, and wherein the torque limit has a maximum and a minimum value and step (E) is performed by progressively changing the maximum value until the maximum value corresponds to the desired torque value and progressively changing the minimum value until the minimum value corresponds to a predetermined absolute minimum value.

7. The method of claim 3, wherein step (C) is performed by changing the current torque value to correspond to the torque limit.

8. The method of claim 1, wherein when the desired torque value is less than the current torque value, step (C) is performed by progressively decreasing the current torque value at the first rate.

9. The method of claim 1, wherein when the desired torque value is greater than the current torque value, step (C) is performed by progressively increasing the current torque value at the first rate.

10. The method of claim 1, wherein step (E) is performed by setting a torque limit, changing the current torque value to be within the set limit, and changing the limit at the second rate as a function of time such that the current torque value changes at the second rate.

11. The method of claim 10, wherein step (E) is performed by progressively increasing the limit.

12. The method of claim 10, wherein the torque limit has a maximum and a minimum value and wherein step (E) is performed by progressively changing the maximum value until the maximum value corresponds to the desired torque value and progressively changing the minimum value until the minimum value corresponds to a predetermined absolute minimum value.

13. A method of controlling a current torque value in a vehicle transmission, comprising the steps of:

(A) determining a desired torque value;

(B) defining a condition when the current torque value corresponds to the desired torque value;

(C) setting a torque limit having a maximum and a minimum value;

(D) changing the current torque value so that the current torque value is within the limit from step (C) and the current torque value approaches the desired value from step (A);

(E) progressively changing the torque limit so that the maximum limit value approaches the desired torque value and the minimum limit value approaches a preselected absolute minimum value;

(F) reperforming steps (D) and (E) until the condition from step (B) exists.

14. The method of claim 13, wherein steps (D) and (E) are performed by changing the torque limit at a first rate for a preselected amount of time and then changing the torque limit at a second rate that is greater than the first rate after the preselected amount of time has elapsed.

15. The method of claim 14, wherein step (D) is performed by changing the current torque value to correspond to the torque limit such that the current torque value approaches the desired torque value.

16. The method of claim 13, wherein step (F) includes the substep of determining whether the condition from step (B) exists.

17. A method of controlling a current torque value in a vehicle transmission, comprising the steps of:

(A) determining a desired torque value for use during a portion of a shifting operation;

(B) changing the current torque value to a value within an available torque window such that the current torque value approaches the desired torque value;

(C) progressively expanding the available torque window at a first rate of change until the current torque value corresponds to the desired torque value or a preselected period of time elapses;

(D) when the current torque value does not correspond to the desired torque value and the preselected period of time has lapsed, progressively expanding the torque window at a second rate of change until the current torque value corresponds to the desired torque value.

18. The method of claim 17, wherein the second rate of change is greater than the first rate.

19. The method of claim 18, wherein the desired torque value is greater than the current torque value and wherein step (B) is performed by changing the current torque value to correspond to a maximum value within the available torque window such that the current torque value approaches the desired torque value at a rate equal to the rate that the available torque window expands.

* * * * *